US005718959A

United States Patent [19]

Wieloch et al.

[11] Patent Number: 5,718,959

[45] Date of Patent: Feb. 17, 1998

[54] COMPOSITE WEB SYSTEM

[75] Inventors: Francis J. Wieloch, Penfield; Paul F. Zukoski, Henrietta; Gina M. LaManna, Ontario, all of N.Y.

[73] Assignee: Xerox Corporation, Stamford, Conn.

[21] Appl. No.: 506,234

[22] Filed: Jul. 24, 1995

[51] Int. Cl.[6] .............................. B32B 27/02; B32B 3/00

[52] U.S. Cl. ............................ 428/58; 428/34.1; 428/59; 428/36.9; 430/58; 430/127; 430/132; 430/97; 430/99; 399/155

[58] Field of Search ................................ 428/34.1, 36.9, 428/58, 59; 430/58, 127, 132, 97, 99; 399/155

[56] References Cited

U.S. PATENT DOCUMENTS

| | | | |
|---|---|---|---|
| 5,229,181 | 7/1993 | Daiber et al. | 428/58 |
| 5,385,765 | 1/1995 | Springer et al. | 428/36.1 |
| 5,411,781 | 5/1995 | Sergerie et al. | 428/57 |

*Primary Examiner*—Charles Nold

[57] ABSTRACT

A composite web comprising a flexible first web having a first major surface, a second major surface, a first end and a second end, and a flexible second web having a first end and a second end, the first end of the first web being joined to the first end of the second web, and the first major surface comprising a tacky contact cleaning surface. This composite web may used to clean devices that contact the web prior to, during and subsequent to application of a coating to the web.

19 Claims, 1 Drawing Sheet

COMPOSITE WEB SYSTEM

BACKGROUND OF THE INVENTION

This invention relates in general to cleaning systems and more specifically, to composite web and process for cleaning objects with this composite web.

In the art of electrophotography an electrophotographic plate comprising a photoconductive insulating layer on a conductive layer is imaged by first uniformly electrostatically charging the imaging surface of the photoconductive insulating layer. The plate is then exposed to a pattern of activating electromagnetic radiation such as light, which selectively dissipates the charge in the illuminated areas of the photoconductive insulating layer while leaving behind an electrostatic latent image in the non-illuminated area. This electrostatic latent image may then be developed to form a visible image by depositing finely divided electroscopic toner particles on the surface of the photoconductive insulating layer. The resulting visible toner image can be transferred to a suitable receiving member such as paper. This imaging process may be repeated many times with reusable photoconductive insulating layers.

Multilayered photoreceptors usually comprise a substrate, a conductive layer, an optional hole blocking layer, an optional adhesive layer for flexible photoreceptors, a charge generating layer, and a charge transport layer and, in some embodiments, an anti-curl backing layer for flexible photoreceptor.

Although excellent toner images may be obtained with multilayered photoreceptors, it has been found that as more advanced, higher speed electrophotographic copiers, duplicators and printers were developed, the electrical and mechanical performance requirements have become more demanding. It has also been found that these electrical and mechanical performance requirements are not being met because of defects in one or more of the coated layers of the multilayered photoreceptors. These defects are caused by the presence of dirt particles on the substrate, conductive layer, optional hole blocking layer, optional adhesive layer, charge generating layer, charge transport layer and/or optional anti-curl backing layer. Thus for example, particles of dirt (particulate debris) residing on an uncoated or coated substrate surface during application of coatings to form an electrostatographic imaging member, such as a photoreceptor, can cause bubbles or voids to form in the various applied coating layers. It is believed that the dirt particles behave in a manner similar to a boiling chip which initiates solvent boiling at the location of the particle. This local boiling problem is aggravated when a coating solution is maintained near the boiling point of the coating solvent during deposition of the coating or during drying. The formation of bubbles in a coating is particularly acute in photoreceptor charge generation layer coatings and in charge transport layer coatings. Also, dirt particles tend to trap air during application of a coating and the trapped air expands during drying to form an undesirable bubble in the coating.

Further, any dirt particles residing on one or both major surfaces of an electrophotographic imaging member web substrate can adversely affect adjacent surfaces when the web is rolled up into a roll because the dirt particles cause impressions on the adjacent web surfaces. Because these undesirable impressions can be repeated through more than one overlapping web layer, large sections of a coated web must be scrapped. Where large belts, e.g. ten pitch belts, are to be fabricated, a 10 percent defect rate for a single pitch can result in the discarding of 60 to 70 percent of the entire web because very large expanses of defect free surfaces are required for such large belts.

The sources of the dirt particles include transporting systems, coating systems, drying systems, cooling systems, slitting systems, winding and unwinding systems for belts, debris from the electrophotographic imaging member web or drum substrate itself, workers, and the like.

In relatively thin charge blocking layers, such as organopolysiloxane layers, any dirt particles present on the web or drum substrate surface tends to lift the coating layer and cause local coating voids. This also occurs with relatively thin adhesive layers between a charge blocking layer and a charge generation layer in web photoreceptors. Usually, after a web substrate is coated with the charge blocking layer and adhesive layer, the coated web substrate is rolled up into a roll and transported to another coating station. During unrolling or unwinding of the coated web, static electricity is generated as the outermost ply of the coated web is separated from the roll. This static electricity tends to attract dirt particles to the exposed surfaces of the web.

It has been found that brushing, buffing or other cleaning systems which physically contact the delicate and fragile surfaces of a coated or uncoated electrophotographic imaging member web substrate can cause undesirable scratches in the delicate outer surface of the substrate even if the contact systems are employed in conjunction with electrostatic discharge bars. Cleaning systems that do not contact the coated or uncoated electrophotographic imaging member web substrate, such as air knives and vacuum systems, whether or not assisted with electrostatic discharge bars, are not capable of removing small particles, those having an average particle size of less than about 100 micrometers to 30 micrometers range due to electrostatic attraction and a thin protective inertial air boundary layer on the substrate surface.

The use of a contact cleaner roll making continuous rolling contact with a moving web can remove loose particles of contamination from the web. As the web moves over the cleaner roll, the loose particulate matter is transferred from the web to the cleaner roll which is somewhat adhesive or tacky. As this transfer process continues, the transferred contaminants accumulate on the surface of the cleaner roll. The cleaner roll itself becomes contaminated and is replaced or cleaned periodically to restore its effectiveness. This is typically done by shutting down the system or process, retracting the cleaner roll, and washing and drying it manually. To avoid down time of the system or process, these contact cleaner rolls can be cleaned without interrupting the continuous movement of web through the apparatus by a device for sequential cleaning of the contact cleaner rolls. This type of contact cleaner roll system is disclosed, for example, in U.S. Pat. Np. 5,251,348, the disclosure thereof being incorporated herein in its entirety.

Dirt particles from other components of a web coating system are also preferably cleaned to prevent the particles from transfering from the components to the web during processing. Some these components have been mentioned above such as transport rolls, drive rolls, idler rolls, rubber nip rolls, vacuum rolls, chill rolls, coating applicator rolls, cleaning rolls and the like in coating stations, drying stations, cooling stations, slitting stations, winding and unwinding stations for belts, and the like. Although some of the rolls in a web coating system may be cleaned by a complex resident cleaning device, other rolls are inaccessible for manual hand cleaning and the entire coating system can require shut down and partial dismantling to clean the various rolls in the system. Since production web coating systems can employ over 130 rolls, shut down for manual cleaning entails many hours of down time and extensive labor. Manual cleaning also involves the use of solvents which must be handled with great care during cleaning, e.g. air breathing apparatus, and require special disposal after use.

INFORMATION DISCLOSURE STATEMENT

U.S. Pat. No. 5,251,348 to Corrado et al, issued Oct. 12, 1993—A contact cleaner roll cleaning system is described which includes a frame supporting the system relative to a moving web, a contact cleaner roll turret on the frame, and a roll cleaner on the frame. The turret supports two or more rotatable contact cleaner rolls, an active roll in rolling contact with the web, and an idle roll out of contact with the web for cleaning. The idle roll is kept rotating while it is idle and being cleaned. The turret is rotatable to sequentially put the cleaner rolls into and out of contact with the web. The roll cleaner includes an absorbent cleaning material mounted adjacent to the idle roll for placement against it and movement lengthwise along it to wipe it clean. Spindles advance the cleaning material between wipings of the idle roll, and a liquid delivery system keeps the cleaning material wet.

U.S. Pat. No. 5,275,104 to Corrado et al, issued Jan. 4, 1994—Apparatus is disclosed for cleaning a rotating process roll includes cleaning material supply and take-up rolls and a compliant touch roll, all mounted on a carriage adjacent to a process roll. Touch roll and cleaning material are movable by air cylinders into and out of contact with the process roll. The touch roll is rotatable in one direction only with the take-up roll. A drive motor winds the take-up roll to incrementally and uniformly advance the cleaning material over the touch roll. Period and frequency of the cleaning cycle and sub-cycles are variable by microprocessor control. Supply roll and take-up roll are supported in retractable gudgeons for easy mounting and removal.

Thus, there is a need for a system to produce high quality coated webs such as electrostatographic imaging members in higher yields by effectively removing dirt particles from devices that contact a web prior to, during and subsequent to coating operations.

SUMMARY OF THE INVENTION

It is, therefore, an object of the present invention to provide an improved cleaning system which overcomes the above-noted deficiencies.

It is yet another object of the present invention to provide an improved cleaning system which removes dirt particles having a very small average particle size from devices that contact a web prior to, during and subsequent to coating operations.

It is still another object of the present invention to provide an improved cleaning system which prevents embossing of webs by dirt particles when the webs are wound.

It is another object of the present invention to provide an improved coated web.

It is yet another object of the present invention to provide an improved cleaning system that prevents scratches from forming on a web during coating and cleaning.

It is still another object of the present invention to provide an improved cleaning system which can clean web handling devices that are not normally accessible for simple manual cleaning.

The foregoing objects and others are accomplished in accordance with this invention by providing a composite web comprising a flexible first web having a first major surface, a second major surface, a first end and a second end, and a flexible second web having a first end and a second end, the first end of the first web being joined to the first end of the second web, and the first major surface comprising a tacky contact cleaning surface. This composite web may used to clean devices that contact the web prior to, during and subsequent to application of a coating to the web.

BRIEF DESCRIPTION OF THE DRAWINGS

A more complete understanding of the process of the present invention can be obtained by reference to the accompanying drawings wherein.

The figures are merely schematic illustrations of the present invention. They are not intended to indicate the relative size and dimensions of a contact cleaning system or components thereof.

DETAILED DESCRIPTION OF THE DRAWINGS

Figure 1:
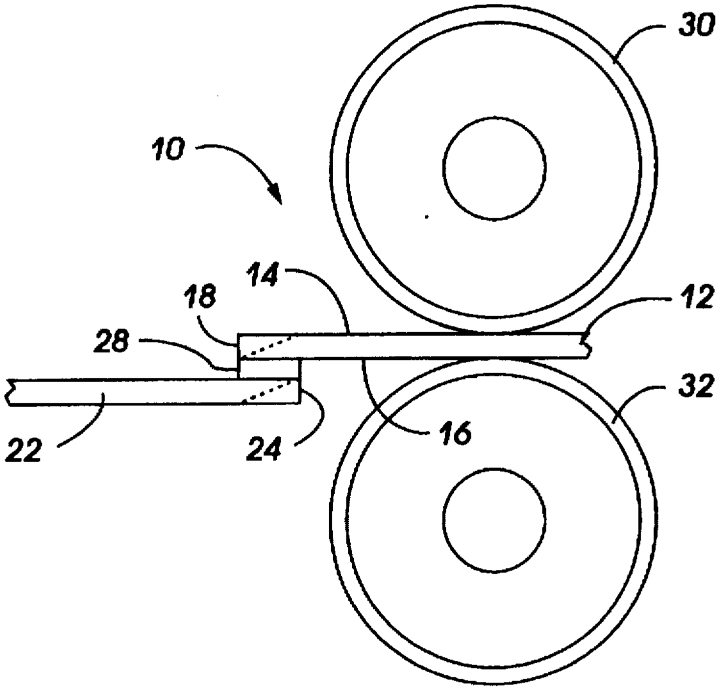
FIG. 1 is a schematic end elevation view of a contact cleaner composite web system used to clean at least one roll.

FIG. 1 shows a composite contact cleaner web system of this invention in a web processing apparatus. The composite web 10 comprises a flexible first web 12 having a first major surface 14, a second major surface 16, a first end 18 and a second end (not shown), and a flexible second web 22 having a first end 24 and a second end (not shown). The first end 18 of first web 12 is joined to the first end 24 of the second web 22 by a double sided adhesive tape 28. Any other suitable alternative joining means may be utilized. Typical joining means include, for example, adhesives, ultrasonic welding, sewing, and the like. The first major surface 14 of flexible first web 12 may comprise a tacky contact cleaning surface. The second major surface 16 of flexible first web 12 may also comprise a tacky contact cleaning surface or be free of any tacky contact cleaning material. Optionally, the first end 18 of first web 12 and first end 24 of second web 22 may be beveled (shown by dashed lines). Thus, in FIG. 1, web 12 represents the cleaning component of composite web 10 and web 22 represents a web that will be subjected to treatments such as a coating operation. Generally, because of the great length of web 22, it is usually in the form of a supply roll from which the leading edge (first end 24) is drawn.

When composite web 10 is transported through web processing systems, composite web 10 contacts the same devices that normally contact an ordinary web. These devices include rotatable rolls such as roll 30 and roll 32. Since the first major surface 14 of flexible first web 12 has a tacky contact cleaning surface, this contact cleaning surface synchronously contacts the outer surface of roll 30 and removes accumulate dirt particles therefrom. Since web 22 will thereafter be brought into contact with the clean outer surface of roll 30, web 22 can be not be contaminated prior to further processing treatments such as the application of a coating. In embodiments where the second major surface 16 of flexible first web 12 comprises a tacky contact cleaning surface, the outer surface of roll 32 will be cleaned at the same time as roll 30.

Figure 2:
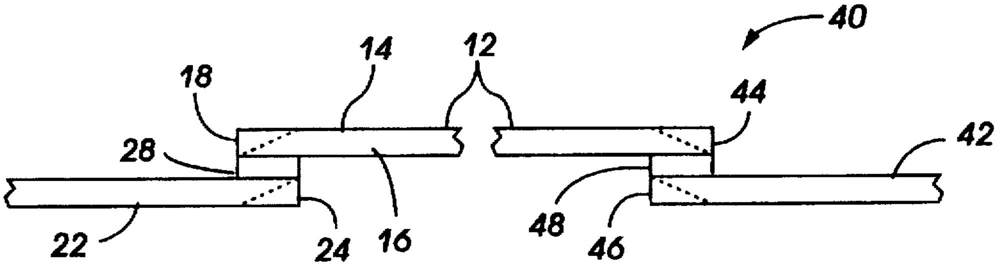
FIG. 2 is a schematic side elevation view of an embodiment of a contact cleaner composite web system.

Referring to FIG. 2, composite web 40 is illustrated. Composite web 40 comprises a first flexible web 12, a second flexible web 22 and a third flexible web 42. First flexible web 12 has a first major surface 14, a second major surface 16, a first end 18 and a second end 44. Flexible second web 22 has a first end 24 and a second end (not shown). Flexible third web 42 has a first end 46 and a second end (not shown). The first end 18 of first web 12 is joined to the first end 24 of the second web 22 by a double sided adhesive tape 28. The second end 44 of first flexible web 12 is joined to the first end 46 of the third web 42 by a double sided adhesive tape 48. The first major surface 14 of flexible first web 12 may comprise a tacky contact cleaning surface. The second major surface 16 of flexible first web 12 may also comprise a tacky contact cleaning surface or be free of any tacky contact cleaning material.

When composite web 40 is transported through web processing systems, composite web 40 also contacts the same devices that normally contact an ordinary web. These devices include rotatable rolls such as roll 30 and roll 32 shown in FIG. 1. To minimize the time when an ordinary web is not being processed, it is preferable that the leading edge of the cleaning portion of a composite web be attached to the trailing edge of an ordinary web for which processing, such as coating, has almost been completed. Thus, when the coating operation for web 42 is almost completed, the leading edge 44 of the cleaning portion (web 12) of a composite web 40 is attached to the trailing edge 46 of web 42 before trailing edge 46 begins its travels through the processing system. Thus, in FIG. 2, web 12 represents the cleaning component of composite web 40, web 22 represents a web that will be subjected to treatments such as a coating operation and web 42 represents the tail end of a web that has almost completed a treatment process. Since most of web 40 has already been processed, the leading edge and most of the rest of web 40 has already been rolled into a take-up roll.

Figure 3:
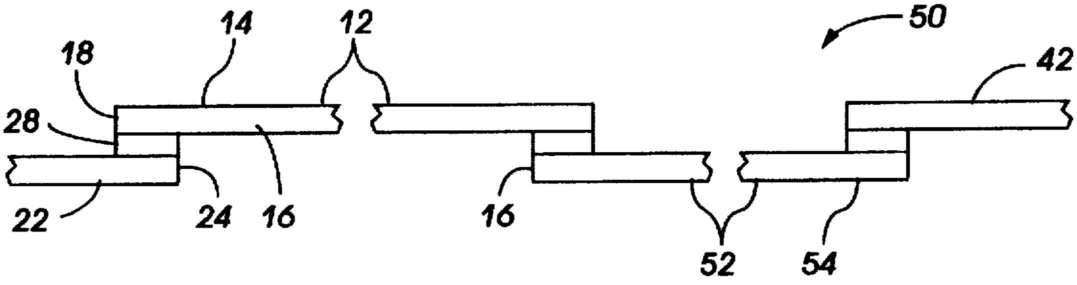
FIG. 3 is a schematic side elevation view of another embodiment of a contact cleaner composite web system.

Shown in FIG. 3 is composite web 50 which is similar in construction to composite web 2 illustrated in FIG. 2. The principle difference is that a fourth flexible web 52 has been interposed between first web 12 and and third web 42. In this embodiment, first web 12 has a contact cleaning surface on only first major surface 14 which faces upwardly and fourth web has a contact cleaning surface on only second major surface 54 which faces downwardly. Thus, instead of one contact cleaning web being used to clean contacting devices on only one side of the composite web (if only one side of the contact cleaning web has a contact cleaning surface) or one contact cleaning web being used to clean contacting devices on both sides of the composite web (if both sides of the contact cleaning web have a contact cleaning surface), two contact cleaning webs are used that each have only a single contact cleaning surface facing in opposite directions to clean contacting devices on both sides of the composite web.

If desired, the contact cleaning web segment may be severed from the composite web after it has traveled through and cleaned a web treatment system to avoid being wound on a take-up roll with the treated web.

The system of this invention comprises composite contact cleaner webs which clean devices which contact webs during a web treatment process such as a web coating process. These composite webs are particularly effective for devices that are inaccessible or difficult to access during a web treatment operation. In addition to a contact cleaning web segment, the composite web of this invention may also comprise a web substrate being drawn from a supply roll prior to application of coating and/or a treated web being wound on a take up roll. Preferably, the web treatment involves coating electrostatographic imaging web substrates including the application of an electrically conductive layer, a charge blocking layer, an optional adhesive layer, a charge generating layer, a charge transport layer and optional overcoating layer. Generally, after a web substrate is coated with the charge blocking layer and adhesive layer, the coated web substrate is rolled up into a roll and transported to another coating station. In some embodiments, the charge transport layer is deposited on the web or drum prior to the charge generating layer. The contact cleaning systems of this invention may also be utilized to clean a bar code application treatment system. Further, the composite web may be used to clean an anti-curl backing layer application system. The composite web not only collects undesirable particulate material from web processing devices such as rollers that it contacts, but any stray airborne particles as well.

Generally, synchronous contact between the contact cleaning web segment and the surface to be cleaned is preferred to prevent any scrubbing action which can remove material of either the contact cleaning member or the surface to be cleaned. This prevents the formation of scratches or unwanted debris on either the surface of contact cleaning web or the surface of the device to be cleaned. Synchronous speeds may be achieved by any suitable technique such as separate synchronized motor drives for the member being cleaned and the contact cleaning member. Alternatively, either the device being cleaned or the contact cleaning member can be driven by the other by frictional contact. Also, the composite web is preferably maintained under tension by conventional means such as supply roll brakes, spring loaded idler rolls and the like to ensure pressure contact with the contact cleaning web segment during cleaning.

The contact cleaning surface may comprise a deposited coating on a supporting film or it may make up the entire cleaning member. A soft conformable contact cleaning material at the surface of the cleaning member is preferred to ensure greater surface area of contact between the contact cleaning surface and the dirt particles than between the dirt particles and the member being cleaned. Thus, the durometer of the contact cleaning material is preferably less than the durometer of the materials in the member being cleaned.

There does not appear to be any criticality in the thickness of a contact cleaning web segment. However, it is preferred that the thickness be similar to the web to be treated to avoid jamming or alteration of treatment apparatus tolerances such as nip roll space settings.

Any suitable tacky cleaning material may be used on the contact cleaning web segments of this invention. Typical tacky cleaning materials include the medium tack materials utilized in "Post-it®" sheets available from the 3M Company. A square test sample having a width of about 5 centimeters of paper coated with medium tack materials such as employed in Post-it® type adhesives will stick to a human finger when the finger is pressed against the adhesive surface and thereafter lifted. These test samples will retain a dirt particle having an average particle size of between about 0.5 micrometer and about 100 micrometers when the test sample is pressed against the particle and lifted away from any smooth surface upon which the dirt particle originally rested. This test defines the expression "medium tack surface" as employed herein. Tacky materials employed in the medium tack coating are believed to contain tacky polymeric elastomeric alkyl acrylate or alkyl methacrylate ester material. Typical medium tack materials are disclosed, for example, in U.S. Pat. No. 4,994,322, the entire disclosure thereof being incorporated herein by reference.

The tacky rubber materials utilized in the contact cleaning members of this invention can have a low tack. The expression "low tack" as employed herein is defined as a tacky surface to which dirt particles having a size less than about 100 micrometers adhere, but to which a human finger does not adhere. Thus, a square test sample piece having a thickness of about 2 millimeters and a width of about 1 centimeter cannot be picked up when a human finger is pressed down against the sample and thereafter lifted. However, when the test sample is pressed against a dirt particle having an average particle size of between about 0.5 micrometer and about 100 micrometers, the dirt particle will adhere to the test sample when the test sample is lifted away from any smooth surface upon which the dirt particle originally rested. The low tack materials utilized in the contact cleaning web segments of this invention may comprise any suitable adhesive material. Typical low tack materials include, for example, polyurethane, natural rubber, and the like. A typical low tack rubbery cross-linked polyurethane material is available from Polymag, Rochester, N.Y. and R. G. Egan, Rochester, N.Y. The low tack rubbery cross-linked polyurethane material has a durometer of about 15–35 Shore A. Low tack rubbery cross-linked polyurethane materials are described in U.S. Pat. No. 5,102,714 and U.S. Pat. No. 5,227,409, the entire disclosures thereof being incorporated herein by reference.

If a rugged surface such as a solid metal transport roller is cleaned with the contact cleaning web of this invention, a high tack material may be employed in the contact cleaning web of this invention because there is no danger of damaging the surface. This is quite different from cleaning a fragile surface such as a thin coating having poor adhesion to an underlying substrate. A typical high tack material is the material utilized in Scotch Brand adhesive tapes such as Magic® adhesive tape available from 3M Company. Other typical high tack adhesives include, for example, rubber cement and the like.

The amount of adhesion of the contact cleaning surface to the surface of any coated substrates during contact cleaning should be less than the peel strength of any coated device being cleaned to ensure that when the contact cleaning surface is separated from the surface being cleaned, the coating remains undamaged on the substrate. Since the peel strength of coatings on a substrate varies with the type of materials employed in the substrate and in coating, the amount of tack exerted by a contact cleaning web segment can vary depending upon the specific materials employed in substrate and coating. For example, a low tack contact polyurethane contact cleaning member surface is preferred for cleaning substrates having fragile coatings. However, the amount of tackiness on a contact cleaning member surface should also be sufficient to remove particles having an average particle size between about 0.5 micrometer and about 100 micrometers when the contact cleaning surface is separated from the surface being cleaned. The degree of tack exhibited by the contact cleaning web segment should also not unduly disrupt the tension or rate of travel of a web being treated if the web treatment requires little or no variation in web tension or speed.

Preferably, the color of the contact cleaning surface is different from the color of the dirt removed from the surface to be cleaned to provide contrast between the color of the dirt particles and the color of the contact cleaning surface. This facilitates determination of when the contact cleaning rolls should be cleaned or replaced and where the dirt particles are located on the contact cleaning surface.

Both the contact cleaning surface of the web segments of the composite webs of this invention and the devices to be cleaned should be sufficiently smooth to ensure contact between the contact cleaning surface and the dirt particles on the surface to be cleaned. Thus, the contact cleaning surface should be continuous. The contact cleaning surface should also not form any deposits on the surface of the treatment devices to be cleaned because such deposits may adversely affect the electrical properties of the final treated web product such as electrostatographic imaging members.

Generally, the length of a contact cleaning web segment to be used in a composite web depends on the type of web treatment devices being cleaned. Although even short lengths will remove dirt particles, a length of at least the circumference of rotating members such as rolls conventionally used in web treatment devices is preferred to ensure cleaning of the entire outer contacting periphery of rotating members.

If reuse of a contact cleaning web segment is desired, any other suitable cleaning technique may be utilized to clean the contact cleaning web segment. The cleaning technique selected depends upon the type of dirt particles picked up by the cleaning member surfaces. Any liquid cleaning material utilized to clean off the contact cleaning member surface is preferably selected from materials that do not dissolve the dirt particles. Dissolving of the accumulated dirt particles can lead to absorption of the dirt into the surface of the contact cleaning member and can also lead to breakdown of the cleaning effectiveness of the contact cleaning surface. Satisfactory results have been achieved with cleaning materials comprising a mixture of water and alcohol. Typical alcohols include, for example, methanol, ethanol, isopropyl alcohol and the like. Generally, the mixture comprises between about 75 percent and about 99 percent by weight water and between about 1 percent and about 25 percent by weight alcohol. The preferred concentration comprises between about 78 and about 82 percent by weight water and between about 18 and about 22 percent alcohol.

When cleaning of the contact cleaning surface becomes less effective and where the thickness of the contact cleaning material is adequate, some of the surface of the contact cleaning surface may be ground or ablated away to remove any embedded dirt present and to also remove some of the ineffective contact cleaning material thereby exposing fresh contact cleaning material.

Preferably, cleaning and coating operations for fabricating electrostatographic imaging members are conducted under clean room conditions such as those at least meeting the requirements of a Class 1000 Clean Room. A Class 1000 Clean Room is defined as a room in which each one cubic foot volume of space does not have a particle count of more than 1000. If desired, more stringent clean room conditions may be utilized. However, for very large coating operations occupying a large volume of space, more stringent cleaning room conditions are more difficult and more expensive to achieve.

An electrostatographic flexible web imaging member at any stage of fabrication can be a component in the composite web of this invention as long as it at least includes a flexible web substrate component. Thus, for the sake of convenience, reference herein to the expression an "electrostatographic flexible web imaging member" is intended to include an electrostatographic flexible web imaging member at any stage of fabrication as long as it at least includes a flexible web substrate component. The electrostatographic flexible web imaging member may be fastened to either the leading edge or trailing edge or both edges of one or more contact cleaning web segments. Electrostatographic flexible web imaging members are well known in the art. Typical electrostatographic flexible web imaging members include, for example, photoreceptors for electrophotographic imaging systems and electroceptors or ionographic members for electrographic imaging systems. Electrostatographic flexible web imaging member may be prepared by various suitable techniques. Typically, a flexible web substrate is provided having an electrically conductive surface. For electrophotographic imaging members, at least one photoconductive layer is then applied to the electrically conductive surface. A charge blocking layer may be applied to the electrically conductive layer prior to the application of the photoconductive layer. If desired, an adhesive layer may be utilized between the charge blocking layer and the photoconductive layer. For multilayered photoreceptors, a charge generation binder layer is usually applied onto the blocking layer and charge transport layer is formed on the charge generation layer. For ionographic imaging members, an electrically insulating dielectric layer is applied to the electrically conductive surface.

The substrate may be opaque or substantially transparent and may comprise numerous suitable materials having the required mechanical properties. Accordingly, the substrate may comprise a layer of an electrically non-conductive or conductive material such as an inorganic or an organic composition. As electrically non-conducting materials there may be employed various resins known for this purpose including polyesters, polycarbonates, polyamides, polyurethanes, and the like which are flexible as thin webs. The electrically insulating or conductive substrate should be flexible and in the form of an endless flexible belt. Preferably, the endless flexible belt shaped substrate comprises a commercially available biaxially oriented polyester known as Mylar, available from E. I. du Pont de Nemours & Co. or Melinex available from ICI.

The thickness of the web substrate layer depends on numerous factors, including beam strength and economical considerations, and thus this layer for a flexible web may be of substantial thickness, for example, about 125 micrometers, or of minimum thickness less than 50 micrometers, provided there are no adverse effects on the final electrostatographic device. In one flexible web embodiment, the thickness of this layer ranges from about 65 micrometers to about 150 micrometers, and preferably from about 75 micrometers to about 100 micrometers for optimum flexibility and minimum stretch when cycled as a belt around small diameter rollers, e.g. 19 millimeter diameter rollers. The surface of the substrate layer is preferably cleaned prior to coating to produce higher quality coatings. Cleaning is preferably effected with the cleaning system of this invention.

The conductive layer may vary in thickness over substantially wide ranges depending on the optical transparency and degree of flexibility desired for the electrostatographic member. Accordingly, for a flexible photoresponsive web imaging device, the thickness of the conductive layer may be between about 20 angstrom units to about 750 angstrom units, and more preferably from about 100 Angstrom units to about 200 angstrom units for an optimum combination of electrical conductivity, flexibility and light transmission. The flexible conductive layer may be an electrically conductive metal or metal alloy layer formed, for example, on the substrate by any suitable coating technique, such as a vacuum depositing technique. Typical metals include aluminum, zirconium, niobium, tantalum, vanadium and hafnium, titanium, nickel, stainless steel, chromium, tungsten, molybdenum, and the like. Typical vacuum depositing techniques include sputtering, magnetron sputtering, RF sputtering, and the like. Regardless of the technique employed to form the metal layer, a thin layer of metal oxide forms on the outer surface of most metals upon exposure to air. Thus, when other layers overlying the metal layer are characterized as "contiguous" layers, it is intended that these overlying contiguous layers may, in fact, contact a thin metal oxide layer that has formed on the outer surface of the oxidizable metal layer.

After formation of an electrically conductive surface, a hole blocking layer may be applied thereto for photoreceptors. Generally, electron blocking layers for positively charged photoreceptors allow holes from the imaging surface of the photoreceptor to migrate toward the conductive layer. Any suitable blocking layer capable of forming an electronic barrier to holes between the adjacent photoconductive layer and the underlying conductive layer may be utilized. Blocking layers are well known in the art and typical blocking layer materials are disclosed, for example, in U.S. Pat. Nos. 4,291,110, 4,338,387, 4,286,033 and 4,291,110, the disclosures of which are incorporated herein in their entirety. A preferred blocking layer comprises a reaction product between a hydrolyzed silane and the oxidized surface of a metal ground plane layer. The blocking layer may be applied by any suitable conventional technique such as spraying, dip coating, draw bar coating, gravure coating, silk screening, air knife coating, reverse roll coating, vacuum deposition, chemical treatment and the like. For convenience in obtaining thin layers, the blocking layers are preferably applied in the form of a dilute solution, with the solvent being removed after deposition of the coating by conventional techniques such as by vacuum, heating and the like. The blocking layer should be continuous and have a thickness of less than about 0.2 micrometer because greater thicknesses may lead to undesirably high residual voltage.

An optional adhesive layer may applied to the hole blocking layer. Any suitable adhesive layer well known in the art may be utilized. Typical adhesive layer materials include, for example, polyesters, duPont 49,000 (available from E. I. duPont de Nemours and Company), Vitel PE100 (available from Goodyear Tire & Rubber), polyurethanes, and the like. Satisfactory results may be achieved with adhesive layer thickness between about 0.05 micrometer (500 angstroms) and about 0.3 micrometer (3,000 angstroms). Conventional techniques for applying an adhesive layer coating mixture to the charge blocking layer include spraying, dip coating, roll coating, wire wound rod coating, gravure coating, Bird applicator coating, and the like. Drying of the deposited coating may be effected by any suitable conventional technique such as oven drying, infra red radiation drying, air drying and the like.

Any suitable photogenerating layer may be applied to the adhesive blocking layer which can then be overcoated with a contiguous hole transport layer as described hereinafter. Typical photogenerating layer comprise inorganic or organic photoconductive pigment particles dispersed in a film forming binder as is well known in the art. Any suitable polymeric film forming binder material may be employed as the matrix in the photogenerating binder layer. Typical polymeric film forming materials include those described, for example, in U.S. Pat. No. 3,121,006, the entire disclosure of which is incorporated herein by reference.

The photogenerating composition or pigment is present in the resinous binder composition in various amounts, generally, however, from about 5 percent by volume to about 90 percent by volume of the photogenerating pigment is dispersed in about 10 percent by volume to about 95 percent by volume of the resinous binder, and preferably from about 20 percent by volume to about 30 percent by volume of the photogenerating pigment is dispersed in about 70 percent by volume to about 80 percent by volume of the resinous binder composition. In one embodiment about 8 percent by volume of the photogenerating pigment is dispersed in about 92 percent by volume of the resinous binder composition.

The photogenerating layer containing photoconductive compositions and/or pigments and the resinous binder material generally ranges in thickness of from about 0.1 micrometer to about 5.0 micrometers, and preferably has a thickness of from about 0.3 micrometer to about 3 micrometers. The photogenerating layer thickness is related to binder content. Higher binder content compositions generally require thicker layers for photogeneration. Thicknesses outside these ranges can be selected providing the objectives of the present invention are achieved.

Any suitable and conventional technique may be utilized to mix and thereafter apply the photogenerating layer coating mixture. Typical application techniques include spraying, dip coating, roll coating, wire wound rod coating, extrusion die coating, curtain coating, and the like. Drying of the deposited coating may be effected by any suitable conventional technique such as oven drying, infra red radiation drying, air drying and the like.

The active charge transport layer may comprise an activating compound useful as an additive dispersed in electrically inactive polymeric materials making these materials electrically active. These compounds may be added to polymeric materials which are incapable of supporting the injection of photogenerated holes from the generation material and incapable of allowing the transport of these holes therethrough. This will convert the electrically inactive polymeric material to a material capable of supporting the injection of photogenerated holes from the generation material and capable of allowing the transport of these holes through the active layer in order to discharge the surface charge on the active layer. An especially preferred transport layer employed in one of the two electrically operative layers in the multilayered photoconductor of this invention comprises from about 25 percent to about 75 percent by weight of at least one charge transporting aromatic amine compound, and about 75 percent to about 25 percent by weight of a polymeric film forming resin in which the aromatic amine is soluble.

Any suitable inactive resin binder soluble in a suitable solvent may be employed in the process of this invention and any suitable and conventional technique may be utilized to mix and thereafter apply the charge transport layer coating mixture to the charge generating layer. Typical application techniques include spraying, dip coating, roll coating, wire wound rod coating, extrusion die coating, curtain coating, and the like. Drying of the deposited coating may be effected by any suitable conventional technique such as oven drying, infra red radiation drying, air drying and the like.

Generally, the thickness of the hole transport layer is between about 10 to about 50 micrometers, but thicknesses outside this range can also be used. The hole transport layer should be an insulator to the extent that the electrostatic charge placed on the hole transport layer is not conducted in the absence of illumination at a rate sufficient to prevent formation and retention of an electrostatic latent image thereon. In general, the ratio of the thickness of the hole transport layer to the charge generator layer is preferably maintained from about 2:1 to 200:1 and in some instances as great as 400:1.

Examples of photosensitive members having at least two electrically operative layers include the charge generator layer and diamine containing transport layer members disclosed in U.S. Pat. No. 4,265,990, U.S. Pat. No. 4,233,384, U.S. Pat. No. 4,306,008, U.S. Pat. No. 4,299,897 and U.S. Pat. No. 4,439,507, the disclosures of these patents being incorporated herein in their entirety. The photoreceptors may comprise, for example, a charge generator layer sandwiched between a conductive surface and a charge transport layer as described above or a charge transport layer sandwiched between a conductive surface and a charge generator layer.

Other layers such as conventional electrically conductive ground strip along one edge of the belt in contact with the conductive layer, blocking layer, adhesive layer or charge generating layer to facilitate connection of the electrically conductive layer of the photoreceptor to ground or to an electrical bias. Ground strips are well known and usually comprise conductive particles dispersed in a film forming binder.

Optionally, an overcoat layer may also be utilized to improve resistance to abrasion. In some cases an anti-curl back coating may be applied to the side opposite the photoreceptor to provide flatness and/or abrasion resistance. These overcoating and anti-curl back coating layers are well known in the art and may comprise thermoplastic organic polymers or inorganic polymers that are electrically insulating or slightly semi-conductive. Overcoatings are continuous and generally have a thickness of less than about 10 micrometers. The thickness of anti-curl backing layers should be sufficient to substantially balance the total forces of the layer or layers on the opposite side of the supporting substrate layer. A thickness between about 5 and about 50 micrometers is a satisfactory range for flexible web photoreceptors.

For electrographic imaging members, a dielectric layer overlying the conductive layer may be substituted for the photoconductive layers. Any suitable, conventional, flexible, electrically insulating dielectric polymer may be used in the dielectric layer of the electrographic imaging member.

A number of examples are set forth hereinbelow and are illustrative of different compositions and conditions that can be utilized in practicing the invention. All proportions are by weight unless otherwise indicated. It will be apparent, however, that the invention can be practiced with many types of compositions and can have many different uses in accordance with the disclosure above and as pointed out hereinafter.

EXAMPLE I

A 6 foot long sample of 3 mil Melinex, three inches wide with a 20% transmission Titanium metal layer, was prepared to simulate a photoreceptor substrate. We attached a 2 foot long piece of 2 inch wide 3M tape, product 3750-DD, a Mylar tape with a high tack adhesive on one side, to one end of the simulated substrate. This simulates our proposed cleaning web with one coated side. A second 2 foot long sample of the high tack tape was attached to the first high tack tape with the adhesive facing the other direction. A 3 foot piece of the metallized Melinex was then attached to the second section of tape to simulate a leader. The 4 section composite roll was wrapped around a two inch diameter roller in a labratory photoreceptor cycling module. The composite roll was then pulled slowly by hand over two other one inch diameter rollers in the labratory fixture in an s shaped path such that each side of the composite roll contacted one of the rollers. These rollers had a lot of dirt on them as the fixture was used for mechanical testing of belts. The tacky sides of the 3M tape each cleaned dirt from the specific roller contacted, as evidenced by dirt on the tape, and the simulated substrate then passed over the cleaned rollers and appeared to have no additional dirt transferred from the cleaned rollers. The sections of tape can be laid flat to facilitate defect analysis using optical or electron microscopes.

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. A composite web comprising a flexible first web having a first major surface, a second major surface, a first end and a second end, and a flexible second web having a first end and a second end, said first end of said first web being joined to said first end of said second web, and said first major surface comprising a tacky contact cleaning surface.

2. A composite web according to claim 1 wherein said first end of said first web is joined to said first end of said second web with an adhesive.

3. A composite web according to claim 1 wherein said first end of said first web is joined to said first end of said second web with a double sided adhesive tape.

4. A composite web according to claim 1 wherein said first web is an electrostatographic imaging web.

5. A composite web according to claim 1 wherein most of said second web is rolled to form a cylindrical shape with said second end of said second web being located at substantially the center of said cylindrical shape.

6. A composite web according to claim 1 wherein said second major surface of said first web comprises a tacky contact cleaning surface.

7. A composite web according to claim 1 wherein said second end of said first web is joined to a first end of a third web.

8. A contact composite web according to claim 7 wherein most of said second web is rolled to form a first cylindrical shape with said second end of said second web being located at substantially the center of said first cylindrical shape and most of said third web is rolled to form a second cylindrical shape with the second end of said third web being located at substantially the center of said second cylindrical shape.

9. A composite web according to claim 7 wherein said third web has a first major surface and a second major surface and said second major surface comprises a tacky contact cleaning surface and said second major surface of said third web faces in a direction opposite the direction faced by said first major surface of said first web.

10. A composite web according to claim 9 wherein said third web is joined to a fourth web.

11. A process for cleaning comprising providing a composite web comprising a flexible first web having a tacky contact cleaning first major surface, a second major surface, a first end and a second end opposite said first end, and a flexible second web having a first end and a second end, said first end of said first web being joined to said first end of said second web and bringing said first major surface into moving synchronous contact with a moving surface of a first roll to clean said first roll.

12. A process according to claim 11 wherein substantially all of said second web is rolled to form a cylindrical shape with said second end of said second web being located at substantially the center of said cylindrical shape.

13. A process according to claim 11 wherein said second end of said first web is joined to a first end of a third web.

14. A process according to claim 13 wherein most of said second web is rolled to form a first cylindrical shape with said second end of said second web being located at substantially the center of said first cylindrical shape and most of said third web is rolled to form a second cylindrical shape with the second end of said third web being located at substantially the center of said second cylindrical shape.

15. A process according to claim 11 wherein said second major surface of said first web comprises contact cleaning material.

16. A process according to claim 15 including bringing said second major surface of said first web into moving synchronous contact with a moving surface of a second roll.

17. A process according to claim 13 wherein said third web has a first major surface and a second major surface and said second major surface comprises a tacky contact cleaning surface and said second major surface of said third web faces in a direction opposite the direction faced by said first major surface of said first web.

18. A composite web according to claim 13 wherein said third web is joined to a fourth web.

19. A process according to claim 18 comprising applying at least one coating to said fourth web, cleaning at least a first roll with said tacky contact cleaning surface of said second major surface of said third web, cleaning at least a second roll with said tacky contact cleaning first major surface surface of said first web and applying at least one coating on said second web.

* * * * *